(12) United States Patent  
Mann

(10) Patent No.: US 9,263,870 B2
(45) Date of Patent: Feb. 16, 2016

(54) SYSTEM AND METHOD FOR APPLYING AN ADHESIVE COATED CABLE TO A SURFACE

(71) Applicant: ADC Telecommunications, Inc., Berwyn, PA (US)

(72) Inventor: William H. Mann, Contoocook, NH (US)

(73) Assignee: CommScope Technologies LLC, Hickory, NC (US)

( * ) Notice: Subject to any disclaimer, the term of this patent is extended or adjusted under 35 U.S.C. 154(b) by 61 days.

(21) Appl. No.: 14/063,732

(22) Filed: Oct. 25, 2013

(65) Prior Publication Data

US 2014/0150971 A1 Jun. 5, 2014

Related U.S. Application Data

(60) Provisional application No. 61/718,340, filed on Oct. 25, 2012.

(51) Int. Cl.
*H02G 3/00* (2006.01)
*H02G 3/30* (2006.01)
(Continued)

(52) U.S. Cl.
CPC ............. *H02G 3/305* (2013.01); *G02B 6/446* (2013.01); *H02G 1/00* (2013.01); *G02B 6/4471* (2013.01); *H01B 7/40* (2013.01)

(58) Field of Classification Search
CPC ............ H02G 1/00; H02G 1/05; H02G 3/26; H02G 3/266; H02G 3/305; H02G 1/06; B29C 66/69; B29C 66/861; G02B 6/46; G02B 6/4466; H01B 7/40; B65H 49/205

USPC ................... 156/71, 391, 433, 574, 577, 578; 29/850

See application file for complete search history.

(56) References Cited

U.S. PATENT DOCUMENTS 3,111,440 A 11/1963 Prentice
3,168,617 A 2/1965 Richter
(Continued)

FOREIGN PATENT DOCUMENTS

BE 905361 A1 12/1986
CN 1056367 A 11/1991
(Continued)

OTHER PUBLICATIONS

"Pressure-sensitive adhesive", Wikipedia, http://en.wikipedia.org/wiki/Pressure-sensitive.sub.--adhesive, Jun. 15, 2011, 4 pages.
(Continued)

*Primary Examiner* — John Goff
(74) *Attorney, Agent, or Firm* — Merchant & Gould P.C.

(57) ABSTRACT

A system and method for installing a fiber or cable on a wall or ceiling of a structure includes providing a fiber, wire or cable pre-coated with a hot melt adhesive that simply needs to be activated by the application of sufficient heat for a sufficient amount of time immediately before installation. Rolls or cartridges of wire or cable pre-coated with the hot melt adhesive are provided. The hot melt adhesive coated wire or cable is fed through a heated chamber, preferably a tip on a portable heating device such as a battery operated soldering iron, which activates the pre-coated hot melt adhesive prior to utilizing the heating tip to apply pressure to the adhesive wire directly to a wall or ceiling thereby adhering the fiber, wire or cable to the desired surface.

34 Claims, 13 Drawing Sheets

(51) Int. Cl.
*H02G 1/00* (2006.01)
*G02B 6/44* (2006.01)
*H01B 7/40* (2006.01)

(56) References Cited

U.S. PATENT DOCUMENTS

| | | | |
|---|---|---|---|
| 3,408,453 | A | 10/1968 | Shelton, Jr. |
| 3,524,921 | A | 8/1970 | Wolf |
| 3,713,947 | A | 1/1973 | Hawkins |
| 3,718,449 | A | 2/1973 | Fahey |
| 3,876,405 | A | 4/1975 | Eilerman |
| 3,988,495 | A | 10/1976 | Lowey et al. |
| 4,251,712 | A | 2/1981 | Parr |
| 4,285,758 | A | 8/1981 | Clausen et al. |
| 4,322,472 | A | 3/1982 | Kaspar et al. |
| 4,341,007 | A | 7/1982 | Kruszona |
| 4,432,607 | A | 2/1984 | Levy |
| 4,450,623 | A * | 5/1984 | Burr ................ 29/850 |
| 4,458,986 | A | 7/1984 | Yuto et al. |
| 4,460,804 | A | 7/1984 | Svejkovsky |
| 4,468,089 | A | 8/1984 | Brorein |
| 4,575,525 | A | 3/1986 | Wacome et al. |
| 4,588,256 | A | 5/1986 | Onstott et al. |
| 4,616,717 | A | 10/1986 | Luetzow |
| 4,626,298 | A | 12/1986 | Allard |
| 4,639,395 | A | 1/1987 | Clarke et al. |
| 4,719,264 | A | 1/1988 | Lotz, Jr. |
| 4,911,525 | A | 3/1990 | Hicks et al. |
| 4,918,260 | A * | 4/1990 | Griffith et al. ............ 174/256 |
| 4,934,312 | A | 6/1990 | Koster et al. |
| 4,950,049 | A | 8/1990 | Darsey et al. |
| 5,042,902 | A | 8/1991 | Huebscher et al. |
| 5,218,658 | A | 6/1993 | Macleod |
| 5,296,535 | A | 3/1994 | Nesiewicz et al. |
| 5,516,857 | A | 5/1996 | Mann |
| 5,580,946 | A | 12/1996 | Mann |
| 5,662,767 | A | 9/1997 | Getz et al. |
| 5,865,927 | A * | 2/1999 | Puletti et al. ............ 156/244.11 |
| 5,868,900 | A | 2/1999 | Haglund |
| 6,085,004 | A | 7/2000 | Dower et al. |
| 6,212,778 | B1 | 4/2001 | Carter |
| 6,230,890 | B1 * | 5/2001 | Waver et al. .............. 206/447 |
| 6,417,451 | B1 | 7/2002 | Uchiyama |
| 6,610,159 | B2 * | 8/2003 | Henegar ................ 156/82 |
| 6,656,319 | B1 | 12/2003 | Boyd et al. |
| 6,915,549 | B2 | 7/2005 | Forsberg et al. |
| 6,931,814 | B2 | 8/2005 | Henits |
| 7,112,746 | B2 | 9/2006 | Tsukahara et al. |
| 7,141,768 | B2 | 11/2006 | Malofsky et al. |
| 7,235,608 | B2 | 6/2007 | Hu et al. |
| 7,328,547 | B2 * | 2/2008 | Mehta et al. .............. 53/428 |
| 7,854,812 | B2 | 12/2010 | Harman, Jr. |
| 8,021,741 | B2 | 9/2011 | Chen et al. |
| 8,295,670 | B2 | 10/2012 | Berglund et al. |
| 8,360,127 | B2 | 1/2013 | Thompson et al. |
| 8,428,405 | B2 | 4/2013 | Kewitsch |
| 8,574,385 | B2 | 11/2013 | Malofsky et al. |
| 2002/0048445 | A1 | 4/2002 | Kordahi |
| 2003/0178221 | A1 | 9/2003 | Chiu et al. |
| 2005/0288412 | A1 * | 12/2005 | Hohner et al. ............ 524/384 |
| 2006/0042819 | A1 | 3/2006 | Tsukahara et al. |
| 2006/0177634 | A1 | 8/2006 | Lazar et al. |
| 2008/0187276 | A1 | 8/2008 | Roberts et al. |
| 2008/0206557 | A1 | 8/2008 | Nienaber et al. |
| 2008/0310802 | A1 | 12/2008 | Hager et al. |
| 2009/0297104 | A1 | 12/2009 | Kachmar |
| 2010/0237058 | A1 * | 9/2010 | Evans et al. ............ 219/229 |
| 2012/0020635 | A1 | 1/2012 | Hendrickson et al. |
| 2012/0066987 | A1 | 3/2012 | Malofsky et al. |
| 2012/0138214 | A1 | 6/2012 | Burek et al. |
| 2012/0294580 | A1 | 11/2012 | Burek et al. |
| 2013/0020015 | A1 | 1/2013 | Dickinson et al. |
| 2013/0098557 | A1 | 4/2013 | Takeuchi et al. |
| 2013/0292035 | A1 | 11/2013 | Dickinson et al. |
| 2013/0294734 | A1 | 11/2013 | Takeuchi et al. |
| 2013/0333822 | A1 | 12/2013 | Dickinson et al. |
| 2014/0020815 | A1 | 1/2014 | Dickinson et al. |

FOREIGN PATENT DOCUMENTS

| | | |
|---|---|---|
| CN | 1056367 C | 9/2000 |
| DE | 32 36 173 A1 | 4/1984 |
| DE | 195 33 766 C1 | 10/1996 |
| DE | 196 41 179 C1 | 5/1998 |
| DE | 20 2004 002 238 U1 | 5/2004 |
| EP | 0 211 677 A1 | 2/1987 |
| EP | 0 126 577 B1 | 3/1987 |
| EP | 0 556 384 A1 | 8/1993 |
| GB | 2483950 A | 3/2012 |
| GR | 64194 | 8/1980 |
| JP | 49-29476 | 3/1974 |
| JP | 55-132259 | 10/1980 |
| JP | 56-64610 | 5/1981 |
| JP | 57-96403 | 6/1982 |
| JP | 58-99714 U | 7/1983 |
| JP | 60-150009 | 8/1985 |
| JP | 60-184205 U | 12/1985 |
| JP | 62-131308 U | 8/1987 |
| JP | 63-87724 U | 6/1988 |
| JP | 1-213912 | 8/1989 |
| JP | 1-278089 | 11/1989 |
| JP | 02027609 A * | 1/1990 |
| JP | 4-6127 U | 1/1992 |
| JP | 2000-106039 | 4/2000 |
| JP | 2001-312923 | 11/2001 |
| WO | WO 01/86663 A2 | 11/2001 |
| WO | WO 2009/091243 A1 | 7/2009 |
| WO | WO 2012/012357 A1 | 1/2012 |
| WO | WO 2012/012362 A2 | 1/2012 |

OTHER PUBLICATIONS

"Tackifiers for Hot Melt Adhesives", SpecialChem, Jan. 15, 2003, 8 pages.
3M™ One Pass Fiber Pathway, 5 pages (Copyright 2012).
Bamborough, Derek, "The Chemistry of Tackifying Resins—Part III", SpecialChem, Mar. 26, 2003, 9 pages.
Brelsford, Cathy, et al, "New Tackifier Dispersions for Water-based Pressure Sensitive Adhesives", Jun. 15, 2011, 9 pages.
Chemsultants International, "Pressure Sensitive Adhesive Information", http://www.chemsultants.com/technical-resources/pressure-sensitive-adhesi-ve-info.aspx, Jun. 15, 2011, 4 pages.
Component Video FlatWire Installation, http://www.flatwireready.com/installation/video.html, 5 pages (downloaded May 13, 2011).
Donker, Chretien, "The Chemistry of Tackifying Resins—Part I", SpecialChem, Oct. 21, 2002, 5 pages.
Donker, Chretien, "The Chemistry of Tackifying Resins—Part II", SpecialChem, Nov. 11, 2002, 10 pages.
Extance, Andy, "The Importance of Polymer Structure in Pressure Sensitive Adhesives", SpecialChem, Dec. 3, 2008, 5 pages.
Extance, Andy, "Using Tackifiers and Plasticizers in Pressure Sensitive Adhesives", SpecialChem, Feb. 25, 2009, 6 pages.
EZ-Bend® InvisiLight™ Optical Solution Supporting Multiple Dwelling Unit (MDU) and In-Home Wiring Applications, 2 pages (Copyright 2013).
Garud, S., "3M Debuts One Pass Mini Fiber Pathway Solution," http://dark-fiber.tmcnet.com/topcs/dark-fiber/articles/170677-3m-debuts-one-pass-mini-fi . . . , 10 pages (May 3, 2011).
Goodwood: Flat Invisible Wiring, http://brianhayes.com/goodwood/2007/06/flat-invisible-wiring.html, 2 pages (Jun. 2007).
Hot Melt Adhesive Coated Yarns, http://www.eytechnologies.com/hot_melt_adhesive_coated_yarns.html, 1 page (Date Printed May 13, 2011).
International Search Report and Written Opinion from PCT application No. PCT/US2011/044430 mailed Feb. 14, 2012 (18 pages).
New Sartomer Products, "New Metal Acrylate Oligomers Improve Performance in Thin UV-Curable Pressure-Sensitive Adhesives", http://www.sartomer.com/newsletter/en2404.sub.--cn2405.sub.--psa.htm, Jun. 15, 2011, 4 pages.
Northwest Adhesives, Inc.—HM String & Tape, http://www.northwestadhesives.com/plywood_adhesives.htm, 1 page (Date Printed May 13, 2011).

(56) References Cited

OTHER PUBLICATIONS

Petisce, J., "The Evolution of Polymeric Optical Fiber Coatings," *Proc. SPIE*, vol. 2290, pp. 2-6 (Sep. 28, 1994).
Petrie, Edward M., "Additives for Pressure Sensitive Adhesives", SpecialChem, Nov. 4, 2002, 8 pages.
Petrie, Edward M., "Formulating UV Curing Liquid Pressure Sensitive Adhesives", SpecialChem, Sep. 24, 2008, 10 pages.
Pressure Sensitive Tape Council (PSTC), "Library Categories", http://www.pstc.org/i4a/pp./index.cfm?pageID=3320, Jun. 15, 2011, 2 pages.
Teflon® FEP Product Information Sheets, DuPont™ Teflon® FEP, http://www2.dupont.com/Teflon_Industrial/en_US/tech_info/prodinfo_fep . . . , 2 pages (Copyright 2013).
The Adhesive and Sealant Council, Inc. (ASC), "Glossary of Terms used in the Pressure Sensitive Adhesive Industry", Jun. 15, 2011, 8 pages.
The Thread Exhange, Inc.: Waxed Thread, http://www.thethreadexchange.com/miva/merchant.mvc?Screen=CTGY&Store_Code=TT, 1 page (Date Printed May 13, 2011).
Turunen, H. et al., "Advances in High Speed Optical Fiber Coloring," *Proceedings of the International Wire & Cable Symposium, 56th IWCS Conference,* pp. 427-430 (Nov. 11-14, 2007).
U.S. Appl. No. 61/365,963 entitled "Home Fiber Routing System".
U.S. Appl. No. 61/374,381 entitled "System and Method for Adhering Fiber Optic Cable to Walls and Ceilings".
U.S. Appl. No. 61/483,931 entitled "EZ-Bend ILU Micro-Drop Solution".
U.S. Appl. No. 61/497,871 entitled "Attaching a Line to a Surface".
Yoo, S-Y. et al., "Isothermal Flow in an Optical Fiber Coating Applicator and Die System," *Journal of Lightwave Technology,* vol. 24, No. 1, pp. 449-463 (Jan. 2006).
International Search Report and Written Opinion for PCT/US2013/066812 mailed Feb. 24, 2014.

* cited by examiner

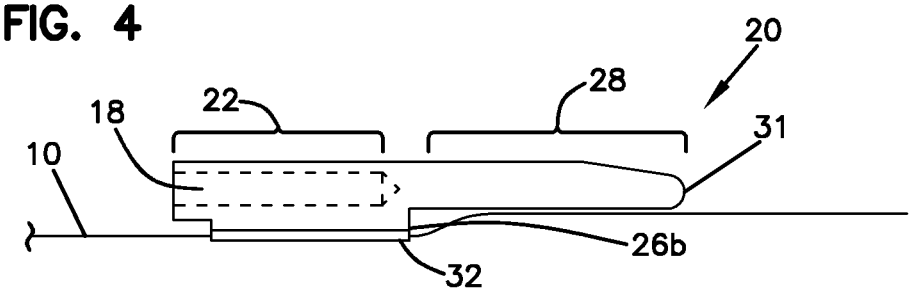
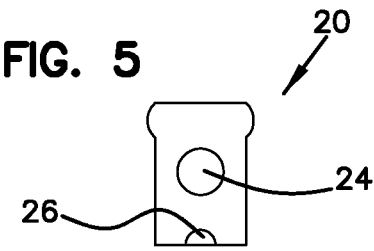
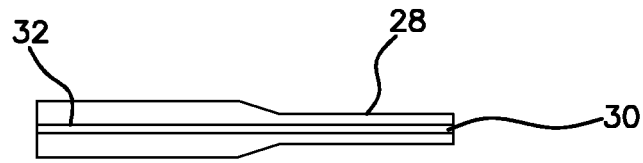
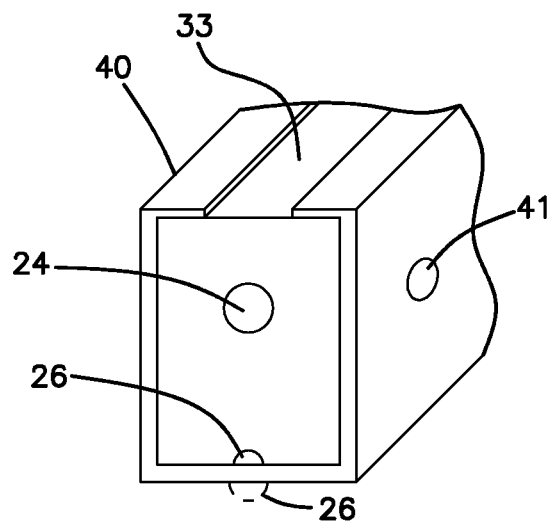
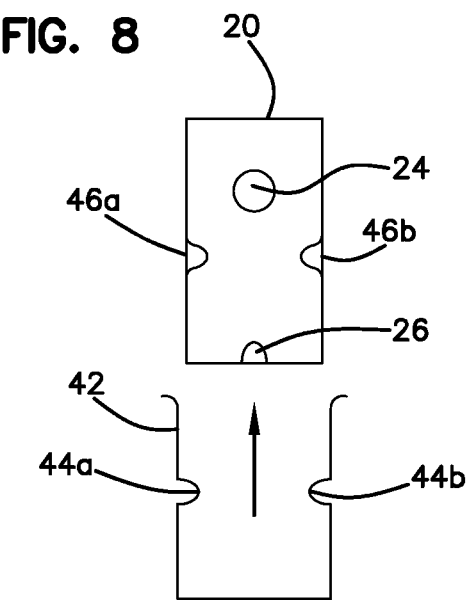

SYSTEM AND METHOD FOR APPLYING AN ADHESIVE COATED CABLE TO A SURFACE

CROSS-REFERENCE TO RELATED APPLICATION

This application claims the benefit of U.S. Provisional Application Ser. No. 61/718,340 entitled "SYSTEM AND METHOD FOR APPLYING AN ADHESIVE COATED CABLE TO A SURFACE" filed Oct. 25, 2012, and which is incorporated fully herein by reference.

TECHNICAL FIELD

The present invention relates to the installation of wires and/or cables in interior spaces and more particularly, relates to a system and method for adhering cables and wires, such as fiber optic cable, to walls, trim and ceilings in either the interior or exterior of residential and business establishments.

BACKGROUND INFORMATION

The move from traditional copper or coax wiring to fiber optic cable and wires for providing telephone, Internet, television, security, home automation control and other low voltage applications is fast becoming the norm. The use of this new technology, however, requires the installation of fiber optic cables and/or individual fiber optic wires and connectors in homes and business establishments. In the case of new construction, this is not a problem but in the case of existing structures, it is not always easy and in fact is sometimes very difficult or impossible to run fiber optic wire within the walls of an existing structure.

In some residential complexes such as apartments and also in business units such as offices and other commercial establishments, it is much more desirable to provide a larger fiber optic cable within a common area such as a hallway, stairway or the like and then to run individual wires within each apartment. Not only is this at times the only feasible way of getting fiber optic wires and/or cables within a pre-existing and already constructed building but in addition, an added benefit is the ability to terminate a fiber optic wire wherever the resident/occupant desires within their apartment or business space such as in individual rooms or offices.

Landlords, however, are reluctant to allow of the permanent installation of wires on apartment walls or ceilings or even on the exterior of a structure for fear that they will either damage the apartment or provide an unsightly wire configuration. In addition, if the next tenant wishes to have the wires located in a different place (for example on a different wall in a living room), the removal of the wiring installed by or on behalf of the previous tenant may cause damage to the walls or ceilings while mechanical fasteners presently used will also damage the walls or woodwork.

Accordingly, what is needed is a system and method to allow an installer to quickly and easily install, either preferably at the ceiling level (the interface between the wall and the ceiling) or along the floorboard, a thin fiber optic wire or cable, and wherein such wire or cable can be adhered to the wall or ceiling with an adhesive that is easily activated and easily removable without leaving a residue (or with minimal residue) or without damaging the walls or ceilings and which wire is paintable if desired to be made essentially "invisible".

SUMMARY OF THE INVENTION

The present invention features, according to one embodiment, a method of installing a hot-melt adhesive coated fiber optic cable to a surface. The method includes providing a length of fiber optic cable pre-coated with a hot-melt adhesive as well as providing a heating device, configured for heating the fiber optic cable pre-coated with hot melt adhesive with sufficient heat to cause the hot-melt adhesive to become softened and adhere to a surface. The method is completed by applying sufficient pressure to the adhesive softened fiber optic cable pre-coated with a hot-melt adhesive to adhere the fiber-optic cable to the surface.

The fiber-optic cable may have a diameter of between 0.9 and 1.9 mm while the hot-melt adhesive may be applied to the fiber-optic cable in a thickness of between 300 and 400 μ. The fiber-optic cable may also be pre-coated with a hot-melt adhesive includes a wax coating over the hot-melt adhesive coating. The fiber optic cable may be a single fiber, fiber optic cable or a multiple fiber, fiber optic cable.

The heating device may comprise a heating tool including a heating and installation tip, wherein the heating and installation tip includes a slide cover having at least one longitudinal opening extending a complete length of the slide cover, and wherein the heating and installation tip in combination with the slide cover when in use generally surrounds the fiber optic cable pre-coated with hot-melt adhesive and supplies sufficient heat generally completely around said fiber-optic cable thereby causing a sufficient quantity of the hot melt adhesive to become softened for allowing the fiber-optic cable to be adhered to a surface.

In one embodiment, the heating device is a battery operated heating tool such as a battery operated soldering iron. The heating tool preferably includes a heating tip, and wherein the heating and installation tip is configured to slide over and engage with the heating tip of the heating tool.

In the preferred embodiment, the heating and installation tip includes a first portion, configured for engaging with the heating tip of the heating tool, and a second portion having a rounded tip, configured for applying pressure to the fiber-optic cable having the adhesive softened hot-melt adhesive against a surface to which the fiber-optic cable is to be adhered. In the preferred embodiment, the first portion of the heating and installation tip includes a channel on one side of the heating and installation tip and wherein the channel includes a first and a second end. The first and second ends of the channel include a conically shaped opening into which the hot-melt adhesive coated fiber-optic cable enters and exits respectively.

The invention also features a heating device for installing a hot-melt adhesive coated fiber optic cable to a surface. The heating device is configured for heating the fiber optic cable pre-coated with hot melt adhesive with sufficient heat to cause the hot-melt adhesive to become softened and adhere to a surface. The heating device comprises a heating tool including a heating and installation tip, wherein the heating and installation tip includes a slide cover having at least one longitudinal opening extending a complete length of the slide cover, and wherein the heating and installation tip in combination with the slide cover when in use generally surrounds the fiber optic cable pre-coated with hot-melt adhesive and supplies sufficient heat generally completely around the fiber-optic cable thereby causing a sufficient quantity of the hot melt adhesive to become softened for allowing the fiber-optic cable to be adhered to a surface.

The heating device may be a corded or battery operated heating tool such as, for example, a battery operated soldering iron. The heating tool may include a heating tip, and wherein the heating and installation tip is configured to slide over and engage with the heating tip of the heating tool. In a preferred embodiment, the heating and installation tip includes a first portion having a first opening. The first opening is configured for engaging with the heating tip of the heating tool. The heating and installation tip may also include a second portion having a rounded tip, configured for applying pressure to the fiber-optic cable having the adhesive softened hot-melt adhesive against a surface to which the fiber-optic cable is to be adhered. The first portion of the heating and installation tip may include a channel on one side of the heating and installation tip. The channel includes a first and a second end, wherein the first and second ends of the channel each include a conically shaped region into which the hot-melt adhesive coated fiber-optic cable enters and exits respectively.

BRIEF DESCRIPTION OF THE DRAWINGS

These and other features and advantages of the present invention will be better understood by reading the following detailed description, taken together with the drawings wherein:

FIG. 4 is a side view of the fiber-optic wire heating and installation tip which engages with the soldering iron heating tip shown in FIG. 3;

FIG. 5 is rear view of the fiber-optic wire heating and installation tip of FIG. 4 according to one embodiment of the present invention;

FIG. 6 is a bottom view of the fiber-optic wire heating and installation tip of FIG. 4 according to one embodiment of the present invention;

FIG. 7 is and end view of a second embodiment of the rear portion of the fiber-optic wire heating and installation tip according to the present invention;

FIG. 8 is an end view of yet another embodiment of the rear portion of the fiber-optic wire heating and installation tip of the present invention;

DETAILED DESCRIPTION OF THE PREFERRED EMBODIMENTS

In the preferred embodiment, the present invention features a standard single strand 900 micron fiber-optic fiber or cable coated with a heat activated (hot melt) adhesive EVA coating approximately 300 to approximately 400 microns thick. The fiber-optic fiber is designed to be adhered to a wall or ceiling (interior or exterior). Multi-strand fiber-optic cables of 1.2 to even 1.9 millimeters in thickness may also be utilized and coated with the same range of 300-400 microns of holt-melt adhesive. Utilizing a clear fiber optic cable and clear hot melt adhesive, the resulting adhered fiber would be essentially invisible. In addition, such a wire could be painted, or the wire itself tinted (white for example) or otherwise modified so that it could blend in very discreetly with a wall or ceiling.

In this embodiment, the heat activated (hot melt) adhesive, that is activated by sufficient heat during field installation, is pre-applied to (i.e. coated on) the fiber. The hot-melt adhesive coated fiber may have a wax coating applied over the hot-melt adhesive and after the hot-melt adhesive dries to minimize or eliminate sticking of the holt-melt coated fiber to itself as it is rolled for storage and later use.

Activation occurs when the hot-melt adhesive material on the fiber or cable is heated with enough heat and for enough time to sufficiently soften or melt the adhesive immediately prior to the cable being applied to the surface. For example, it has been found that using a hot-melt adhesive with a softening point of approximately 198 degrees Fahrenheit (F) heated with an application tip at approximately 250-350 degrees F. allows to properly soften the hot-melt adhesive and make the fiber-optic cable adhere to a surface with an installation speed/rate of up to approximately 1.2 inches per second or 6 feet per minute.

The hot melt adhesive material on the fiber or cable is dry after being applied to the cable, much like conventional hot melt adhesive used for various purposes and well known in the art. In a further version of this first embodiment, the fiber wire or cable may include an acrylic and/or PVC coating surrounding the fiber core. Buffered optical fibers, optical fiber ribbons and small cables are also contemplated.

Figure 1:
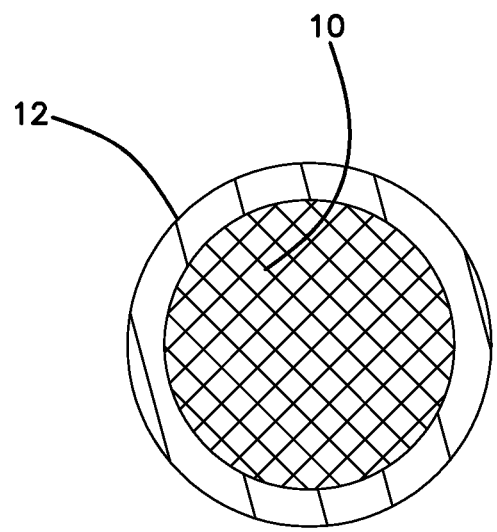
FIG. 1 is a cross-sectional view of one embodiment of a fiber optic wire coated with a hot-melt adhesive coating in accordance with one feature of the present invention.

In the preferred implementation of this first embodiment, a fiber or fiber optic cable 10, FIG. 1, pre-coated with a hot melt adhesive coating 12 awaiting activation by the application of heat, may be stored on a role, bobbin or cartridge or the like and which may be held by the installer on his or her tool belt or at some other convenient easy to use location such as the rear of the installation tool. The type and characteristics of the hot melt adhesive are selectable based on the amount of heat (temperature) at which the hot melt adhesive is desired to melt and the amount of "strength" required of the adhesive/adhesion.

An installation tool such as tool 14 would be required which includes a heat source and a heating and application tip which serves to heat the hot-melt adhesive to the desired temperature and for sufficient time to allow the installer to apply pressure against the cable to force the cable to adhere to the surface to which the cable is being applied and adhered to. In the preferred embodiment, the heating and application tip will comprise two portions, namely, a fiber optic cable heating and installation tip 20 and a slide on cover member 40, both of which will be explained in greater detail below.

Figure 2:
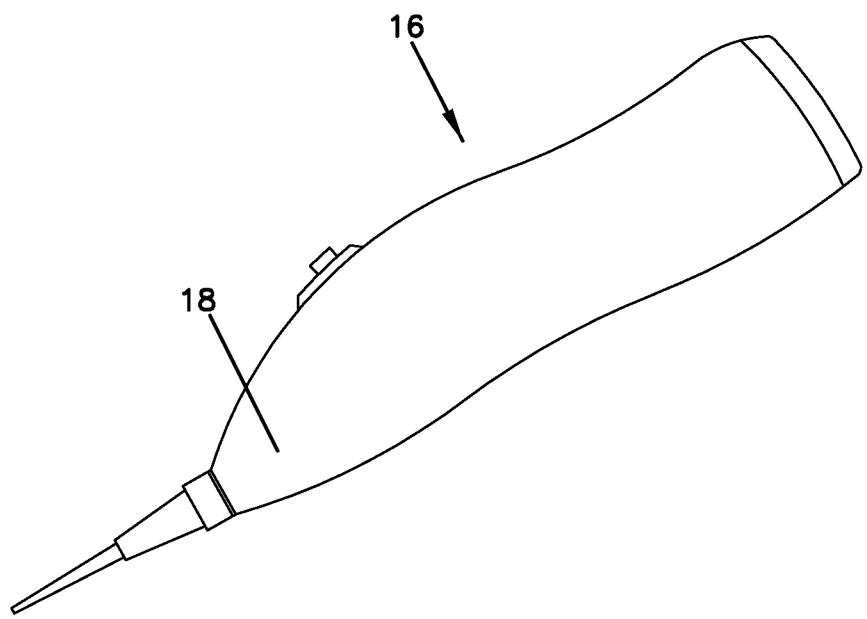
FIG. 2 is a perspective view of one embodiment of a fiber optic wire installation tool in the form of a battery-operated soldering iron that is used to heat a soldering iron tip.
Figure 3:
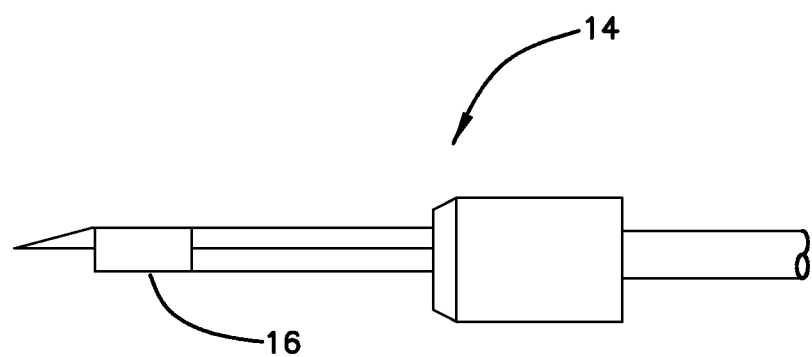
FIG. 3 is a perspective view of a soldering iron tip for the battery-operated soldering iron shown in FIG. 2 according to one embodiment of the present invention.

By way of example only and without limitation, one possible installation tool may include a battery operated soldering iron such as the Weller® brand BP860 battery-operated soldering iron 14, FIG. 2, which is designed to heat up quickly and to reach a working temperature (approximately 500 degrees at the tip) in under 15 seconds. One key feature of this soldering iron is the removable soldering iron tip 16, shown in greater detail in FIG. 3 which is replaceable and further, includes a solid mass tip region 18 over which a fiber-optic heating and cable installation tip 20, FIG. 4 may be inserted. In other examples, the tool 14 can be part of a kit having multiple installation tips 20 and corresponding sleeves forming sets adapted to accommodate cables having differently sized diameters.

As shown in greater detail from the rear or back view of the installation tip 20, FIG. 5, at least the back or rear portion 22 of the installation tip 20 includes a first opening 24 that is designed to fit snugly (friction fit) over the tip region 18 of the soldering iron tip 16. Accordingly, the installation tip 20 may be held in place on the soldering iron tip by a dimensionally tight or snug fit, crimping and/or the use of a high temperature epoxy/adhesive.

The fiber optic cable installation tip 20 is preferably made from a solid piece of heat conducting material such as, but not limited to nickel-plated copper, aluminum, stainless steel, or any other material which easily conducts heat. One possible material choice concern is a material that will not leave or will at least minimize leaving any marks on the installation surface such as the wall or ceiling. The proper use of the tip and the tip's material of construction may be the most important factor in not leaving any marks from the tip on the walls or ceiling.

The back or rear portion 22 of the fiber-optic cable installation tip 20 also includes a second opening 26 which is an entry point to a channel 32 located in the bottom region of the back or rear portion 22 of the fiber-optic cable installation tip 20, and which channel 32 is designed to accept the fiber-optic cable 10 and apply heat to the fiber-optic cable while the cable travels across the bottom of the front portion 28 of the fiber-optic installation tip 20 in channel 32. The front portion 28 of the fiber-optic installation tip 20 is also preferably provided with a slot or groove 30, FIG. 6 into which the cable may be run and which serves to extend the time within which the hot melt adhesive coated fiber-optic cable 10 is a contact with a heat source to be sure that the hot melt adhesive is properly heated and softened to give it the best possible adhesion to the surface. The length of the front portion 28 of the fiber-optic installation tip 20 may be adjusted (shortened or lengthened) based on the amount of time in the amount of heat required to effectively soften the hot melt adhesive to the proper level.

The slot or groove 30 is preferably "angled" (not of the same depth) such that the closer the coated fiber-optic cable gets to the tip 31, more cable (approximately ⅔ of the cable's diameter) is outside of the slot or groove 30, thus minimizing or eliminating the contact of the tip 31 with the wall or ceiling in an attempt to ensure that the tip 31 leaves no mark on the wall or ceiling. In addition, the rounded tip 31 of the front portion 28 of the fiber-optic heating installation tip 20 allows the user of the tool to get into corners, other tight places, and to even install the wire in a circle.

The second opening 26 is preferably conically shaped forming a "funnel" to help "guide" the fiber-optic cable into the opening of the channel/hole 32 formed in the lower edge of the first portion 22 of the heating and installation tip 20. A similar conically or funnel shaped exit opening 26b is provided at the exit end of hole/channel 32. The hole/channel 32 serves (either alone in the case of a chamber or hole 32 or in conjunction with the slide member 40 described below in the case of a channel 32) as an "oven" to heat the hot-melt adhesive on the fiber-optic cable generally about 360 degrees of the fiber-optic cable. In another contemplated embodiment, the conically or funnel shaped fiber entry region 26 may be provided on a bottom region of the slide cover 40 (see FIG. 7) while the channel 32 is also, in this embodiment, provided on and in the bottom region of the slide cover 40.

In the preferred embodiment of the installation tip of the present invention, the rear portion 22 may be configured as shown in FIG. 7 including a first opening 24 which slides over the soldering iron tip and a second opening 26 into which the cable to be heated is inserted. In this embodiment, a slide member 40 is provided and configured to slide over the rear portion 22 and servers to maintain the fiber-optic wire or cable in the channel 32. The slide portion 40 may be removed from the tool so that the heating device may be inserted anywhere along a length of fiber-optic wire or cable. The slide portion 40 also preferably includes a slot 33 in the top exterior surface of the slide portion 40. The slot 33 allows the fiber-optic installation tip 20 to be inserted on the installation tool that has been slid over a fiber-optic wire anywhere along its length and then the slide 40 may be inserted over the tip 20 and fiber-optic cable contained in slot 32. This is particularly useful if a section of cable has not adequately bonded to a surface and the installer wants to reheat the hot melt adhesive and reapply additional pressure in an attempt to get the cable to adhere to the surface. The slide 40 may also include one or more "holes" 41 on either or both sides of the slide 40 which are useful for allowing a user to push off and remove the slide 40 from the heating and installation tip 20.

In a similar fashion shown in another embodiment, a spring clip 42 FIG. 8 may be provided in place of slide 40 described above and which includes first and second indentations 44 which are shaped, sized and positioned to interface with indentations 46 provided in the rear portion 22 of the installation tip 20.

In all situations, it is desirable for the adhesive materials to have a long service life, on the order of 20 to 25 years, and meet appropriate other requirements for interior and/or exterior use. Attachment on demand, robustness and small profile (nearly invisible) are desirable. Preferably, such cable or wiring would be attached at the interface between the ceiling and the wall. This negates the need for the installer to move furniture to gain access to the area near the floor as has been traditionally done with larger cables such as coax cabling and the like. The installer, using an installation tool as described herein, simply walks along and applies the wire at the interface between the ceiling and the wall. If a mistake is made, there is some ability to rewind and reapply the wire or cable if so desired.

Accordingly, the present invention provides a system and method for on demand application of essentially invisible fiber-optic wires and/or cables within a home, apartment, business or the like which allows the installation of such wire or cable at the junction between a wall and ceiling (or any other chosen location) without having to move furniture and disrupt the interior of the space in which the wire or cable is being applied.

Aspects of the present disclosure relate to methods for applying (e.g., attaching) a cable to a surface such as the surface of a wall or ceiling. It will be appreciated that the surface can be an indoor surface or an outdoor surface. As used herein, the term "cable" includes signal carrying (e.g., transmitting, conveying) components. In certain examples, the signal carrying components are spoolable. In certain examples, the signal carrying components are round in transverse cross-sectional shape. In certain examples, these signal conveying components can include a signal carrying/conveying element (i.e., a communication member) such as an optical fiber for carrying optical signals or a metal member such as a copper core for carrying electrical signals. In certain examples, the signal conveying component can include more than one signal carrying elements (e.g., multiple optical fibers or multiple metal signal carrying elements). In certain examples, cables in accordance with the principles of the disclosure can include the strength components that can provide tensile and/or compressive reinforcement to the cables. In other examples, cables in accordance with the principles of the present disclosure may not include any strength components. In certain examples, cables in accordance with the principles of the present disclosure can have a flat configuration (e.g., a fiber optic ribbon cable) or a round configuration.

In a preferred example, a cable in accordance with the principles of the present disclosure has a round transverse cross-sectional shape. In certain examples, such cables can have outer diameters, prior to being coated with adhesive, that are less than 3 mm, or less than 2.5 mm, or less than 2 mm, or less than 1.5 mm. In certain examples, such round cables can have outer diameters, prior to being coated with adhesive, that are in the range of 300 microns to 2.5 mm, or in the range of 500 microns to 2.5 mm, or in the range of 700 microns to 2.5 mm, or in the range of 700 microns to 2 mm, or in the range of 500 microns to 1.5 mm. In certain examples, cables in accordance with the principles of the present disclosure have a round transverse cross-sectional shape and are coated with adhesive around the entire circumference (i.e., 360 degrees) of the cable.

In practicing methods in accordance with the principles of the present disclosure, the thickness of the adhesive pre-applied to the cable is important to the overall functionality of the method. If the adhesive thickness is not large enough, the cable will not effectively adhere to certain textured surfaces commonly encountered in the field. In contrast, if the thickness of the adhesive is too large, it can be difficult to adequately melt the adhesive during application of the cable. This is particularly an issue as installation rates increase. Additionally, if the thickness of the adhesive is too large, adhesive may accumulate in the application tool thereby causing problems in the field. In certain examples of the present disclosure, the adhesive pre-applied to the cable can include a thermally activated (e.g., hot melt) adhesive having a thickness in the range of 200 to 400 microns, or in the range of 200 to 350 microns, or in the range of 250 to 350 microns. In certain examples, the adhesive can have a thickness greater than 200 microns. In certain other examples, the adhesive can have a thickness less than 400 microns, or less than 350 microns, or less than 300 microns.

In certain examples, the adhesive can have a thickness in the range of 10% to 50% of the outer diameter of the cable prior to the application of adhesive. In other examples, the adhesive can have a thickness in the range of 15% to 40% of the outer diameter of the cable prior to the application of adhesive. In still other examples, the adhesive can have a thickness in the range of 20% to 40% of the outer diameter of the cable prior to the application of adhesive. In still other examples, the adhesive can have a thickness in the range of 15% to 35% of the outer diameter of the cable prior to the application of adhesive. In still other examples, the adhesive can have a thickness greater than 15% of the outer diameter of the cable prior to the application of adhesive. In still other examples, the adhesive can have a thickness less than 40% of the outer diameter of the cable prior to the application of adhesive.

As described previously herein, the adhesive material can be thermally activated by passing the cable through an "oven" defined by the installation tip arrangement of the installation tool. In certain examples, the "oven" is defined by a passage that extends through the tip arrangement. In certain examples, the passage has a cross-dimension (e.g., diameter) that is larger than the outer diameter of the cable including the adhesive layer. In some examples, the cross-dimension of the passage is at least 20 percent larger than the diameter of the adhesive coated cable being installed. Thus, minimal contact is made between the cable and the tip arrangement within the "oven." In this way, heated air within the oven can generally fully surround the adhesive coated cable thereby uniformly heating the adhesive as the cable passes through the oven. It will be appreciated that the degree to which the adhesive melts or is softened is dependent upon the temperature within the oven and the residence (i.e., dwell) time of the adhesive coated cable within the oven. In this regard, in certain examples, the oven can operate at temperatures ranging from 200 to 350 degrees Fahrenheit (F), or at temperatures greater than 250 degrees Fahrenheit, or at temperatures ranging from 250 degrees Fahrenheit to 500 degrees Fahrenheit, or at temperatures ranging from 200 degrees Fahrenheit to 400 degrees Fahrenheit. Also, in certain examples, a given location of the adhesive coated cable can have a residence time within the oven in the range of 1-3 seconds when the cable is being installed at a speed of 4-6 feet per minute. In such an example, the oven can be operated at a temperature in the range of 200 to 400 degrees Fahrenheit, the adhesive can have a thickness of 200-400 microns and the adhesive can have a melting point of 180-220 degrees Fahrenheit. Also, the oven can have a length of at least 0.75 inches. In other examples, the thermally activated adhesive can have a melting point in the range of 150-250 degrees F., or in the range of 170-230 degrees F., or in the range of 180-220 degrees F., or in the range of 190-210 degrees F.

It will be appreciated that factors such as the melting point of the adhesive, the thickness of the adhesive, the temperature of the oven and the residence time of a given location of the cable within the oven are balanced to provide appropriate softening of the adhesive at a given cable installation speed. In certain examples, the length of the oven can be increased to increase the residence time of the cable within the oven such faster installation speeds can be supported. Similarly, the melting point of the adhesive can be reduced and the oven temperature can be increased to support increased cable installation rates.

As indicated previously, in certain examples, the cable can be clear (i.e., generally transparent) when attached to a surface. For certain adhesives, ultraviolet (UV) radiation can cause the adhesive to degrade and/or discolor over time. In certain examples of the present disclosure, the thermally activated adhesive applied to the cable can include a composition that includes a UV stabilizer. In certain examples, the UV stabilizer can be selected from a UV absorber, a hindered amine light stabilizer, or a combination thereof. In some examples, the UV stabilizer is a UV absorber. In some examples, the UV absorber is selected from a benzophenone type UV stabilizer, a benzotriazole type UV stabilizer, or other type of UV absorber such as Etocrilene (ethyl 2-cyano-3,3-diphenylpropanoate), Octocrilene (2-ethylhexyl 2-cyano-3,3-diphenylpropanoate, 2-cyano-3,3-diphenyl-2-propanoic acid 2-ethylhexylester), Bemotrizinol (bis-ethylhexyloxyphenol methoxyphenyl triazine, Tinosorb S), or a combination thereof. In some examples, the UV stabilizer is a hindered amine light stabilizer. In some embodiments, the hindered amine light stabilizer is selected from, for example, Tinuvin®770 (Bis(2,2,6,6-tetramethyl-4-piperidyl)sebacate, BASF), Chimassorb®944 (Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]], Ciba), Tinuvin®622 (Butanedioic acid, dimethylester, polymer with 4-hydroxy-2,2,6,6-tetramethyl-1-piperidine ethanol), Tinuvin®944 (Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]])), or a mixture thereof.

It will be appreciated that cable in accordance with the principles of the present disclosure having a pre-applied adhesive can be stored on spools. When the cable is wrapped around the spool, it is desirable for the cable to be easily dispensed from the spool without having excessive adhesion between the various wraps of cable around the spool. In this regard, a low tack layer (i.e., a slippery layer, a non-blocking layer, a non-tack layer, etc.) can be provided around the entire circumference of the cable to facilitate handling and to prevent excessive sticking on the spool. It will be appreciated that the low tack layer is preferably meltable at a temperature less than the melt temperature of the adhesive. In certain examples, the low tack layer has a melting point less than 150 degrees F. Also, the low tack layer can have a thickness that is substantially less than the thickness of the adhesive layer. In one example, the low tack layer has a thickness less than 20% of the thickness of the adhesive layer, or less than 15% of the thickness of the adhesive layer or less than 10% of the thickness of the adhesive layer. Upon heating by the installation tool, the low tack layer melts and is absorbed or otherwise incorporated into the adhesive material such that the low tack layer does not interfere with the effective adherence of the cable to a surface such as a wall surface. In one example, the low tack layer is formed from a composition including at least a wax. In certain examples, the wax can be applied by passing the adhesive coated cable through a wax solution and then allowing the applied wax solution to dry such that a uniform coating of wax is provided about the circumference of the adhesive. In other examples, a wax coating in the form of a wax powder may be applied about the circumference of the adhesive. In other examples, the wax is applied as a wax emulsion having less than 10% solids. The wax emulsion can be flash dried (e.g., in an oven) to remove water from the applied emulsion after application to the cable.

The low tack layer has no tack or sufficiently low tack that the cable can be dispensed from a spool without damaging the dispensed cable or the underlying cable on the spool. For example, the low tack layer prevent adhesive from being pealed or otherwise removed from the cable being dispensed or the underlying cable on the spool as the cable is dispensed/uncoiled from the spool. In certain examples, the low tack layer has lower tack than the thermally activated adhesive layer that the low tack layer covers.

As indicated above, in some examples, the low tack layer can include a wax. In some examples, the wax is selected from a single wax or a mixture of waxes. In some examples, the wax or mixture is selected from the group consisting of a natural wax, fossil or earth wax, petroleum wax, or synthetic wax. In some examples, the wax is a non-ionic wax having a melting point less than 150° F. In some examples, the wax is a non-ionic paraffin wax having a melting point less than 150° F. In some embodiments, the wax is an emulsifier.

In certain examples, the thermally activated adhesive applied to the cable has a pre-determined "open" time. The "open" time is the period after thermal activation that the adhesive maintains a sufficient amount of tack for the adhesive to effectively secure the cable to a surface. After the "open" time has passed, the adhesive "closes" and no longer has sufficient adhesive properties to provide effective adherence of the cable to the surface. It is desirable for the adhesive to close to prevent the adhesive from collecting dust and other dirt over time thereby compromising the aesthetic appearance of the cable when the cable is attached to a wall. However, the adhesive should remain "open" long enough to allow an installer to effectively attach the cable to a surface such as a wall. In certain examples, the thermally activated adhesive has an "open" time of at least 2 seconds at 65 degrees Fahrenheit. In other examples, the thermally activated adhesive has an open time of 2-10 seconds at 65 degrees Fahrenheit. In still other examples, the thermally activated adhesive has an open time in the range of 2-5 seconds at 65 degrees Fahrenheit.

In certain examples, the thermally activated adhesive layer is formed from a composition that includes at least ethylene-vinyl acetate (EVA). In certain examples, prior to applying the thermally activated adhesive to the cable, a tie layer can be applied to the cable. It will be appreciated that the tie layer can function to facilitate providing an effective bond between the cable and the adhesive layer. In certain examples, the outer layer of the cable includes a material formed from a composition including polyvinyl chloride (PVC) and the adhesive layer is formed from a composition that includes EVA. In such an example, a tie layer that enhances the bonding to the vinyl molecules of the PVC can be provided. In other examples, the outer material of the jacket can include a composition formed by one or more materials including at least EVA, and the adhesive layer can include a material formed from a composition formed by one or more materials including at least EVA. In such an example, because both the cable and the adhesive use EVA as a component, bonding can occur between the adhesive and the jacket without the need for an intermediate tie layer. Thus, it will be appreciated that in certain examples, tie layers are optional. In other examples, different tie layers can be selected based on the compatibility of the materials used to form the outermost layer of the cable and the thermally activated adhesive. In certain examples, the thermally activated adhesive is an EVA-based adhesive, the outer layer of the cable includes nylon or urethane or combinations thereof, and a tie layer for enhancing adhesion is provided between the cable and the adhesive layer.

In certain examples, the tie layer can have a thickness that is less than 15 percent of the thickness of the adhesive layer or less than 10 percent of the thickness of the adhesive layer. Also, the tie layer can be applied by passing the cable through a solution including less than 10% by weight of the tie layer material, and then flashing off the solvent.

The tie layer can be an intervening layer between a buffer layer and the adhesive layer that bonds to both the buffer layer and the adhesive layer. In some examples, the tie layer bonds to a buffer layer prepared from a composition comprising PVC, acrylic, nylon and/or urethane and also to an adhesive layer. In some examples, the adhesive layer comprises a hot-melt adhesive. In some examples, the hot-melt adhesive is an ethylene vinyl acetate (EVA) based adhesive. The tie layer between, for example, EVA and PVC, can be prepared from a composition comprising one or more of a urethane, polyamide, or copolyamide. In some examples, the tie layer is prepared from a composition comprising a polyamide with a secondary amine. In some examples, the tie layer is prepared from a composition comprising a polyamide with a secondary amine selected from piperazine and/or ethylene diamine and a dimer acid. In some examples, the tie layer is prepared from a composition comprising dipiperazine or a dipiperazine polyamide.

It will be appreciated that the thermally activated adhesive can be applied to the cable by a variety of different techniques. In certain examples, the thermally activated adhesive can be applied to the cable using an extrusion process. Other examples, other coating techniques such as spraying techniques or passing the cable through an adhesive bath can be utilized to provide the desired adhesive coating.

To ensure effective adhesion of the cable to a surface such as a wall, it is desirable for the adhesive to have a suitable viscosity that allows the adhesive to effectively conform to irregularities in the surface and also prevents the adhesive from running/dripping off the cable and/or clogging the installation tool. In certain examples, the thermally activated adhesive can have a viscosity in the range of 5,000 to 20,000 centipoise at 350 degrees Fahrenheit. In other examples, the thermally activated adhesive can have a viscosity of 7,000 to 15,000 centipoise at 350 degrees Fahrenheit. In still other examples, the thermally activated adhesive can have a viscosity of 8,000 to 14,000 centipoise at 350 degrees Fahrenheit. In another example, the thermally activated adhesive can have a viscosity of 10,000 to 13,000 at 350 degrees Fahrenheit.

It is desirable for the thermally activated adhesive to have a melting point coordinated with the anticipated residence time of the cable within the oven and also coordinated with the anticipated temperature of the oven during normal applications. In certain examples, the thermally activated adhesive has a melting point in the range of 150 to 300 degrees Fahrenheit. In another example, the thermally activated adhesive can have a melting point in the range of 180 to 220 degrees Fahrenheit. In still other examples, the thermally activated adhesive can have a melting point in the range of 190 to 210 degrees Fahrenheit.

In certain examples, the cable can include one or more optical fibers. In certain examples, the optical fibers can be manufactured to reduce the sensitivity of the optical fibers to micro or macro-bending (hereinafter referred to as "bend insensitive"). An example bend insensitive fiber has been described in U.S. Patent Application Publication Nos. 2007/0127878 and 2007/0280615 that are hereby incorporated by reference in their entireties.

Figure 9:
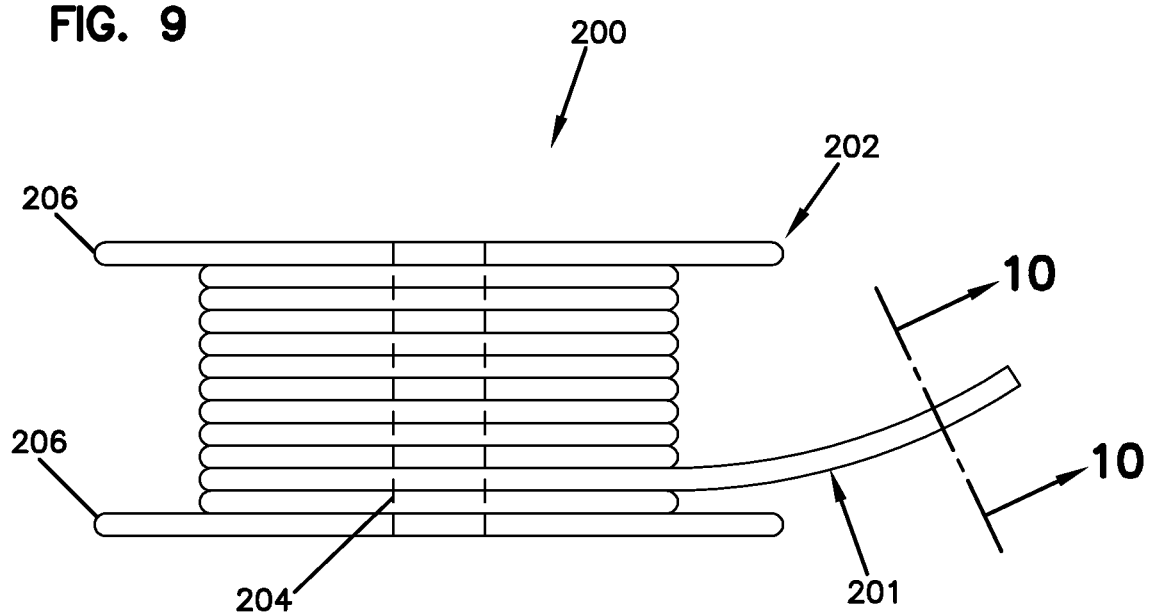
FIG. 9 shows a cable assembly in accordance with the principles of the present disclosure.

FIG. 9 illustrates a cable assembly 200 in accordance with the principles of the present disclosure. The cable assembly 200 includes a spool 202 having a drum 204 and two opposing flanges 206. An adhesive coated cable arrangement 201 is coiled about the drum 204 between the flanges 206. In one example, shown at FIG. 10, the adhesive coated cable arrangement 201 includes a cable 208 and an adhesive arrangement 209 that covers the cable 208. In one example, the adhesive arrangement 209 provides full adhesive coverage (e.g., 360 degrees of coverage) around the circumference of the cable 208.

Figure 10:
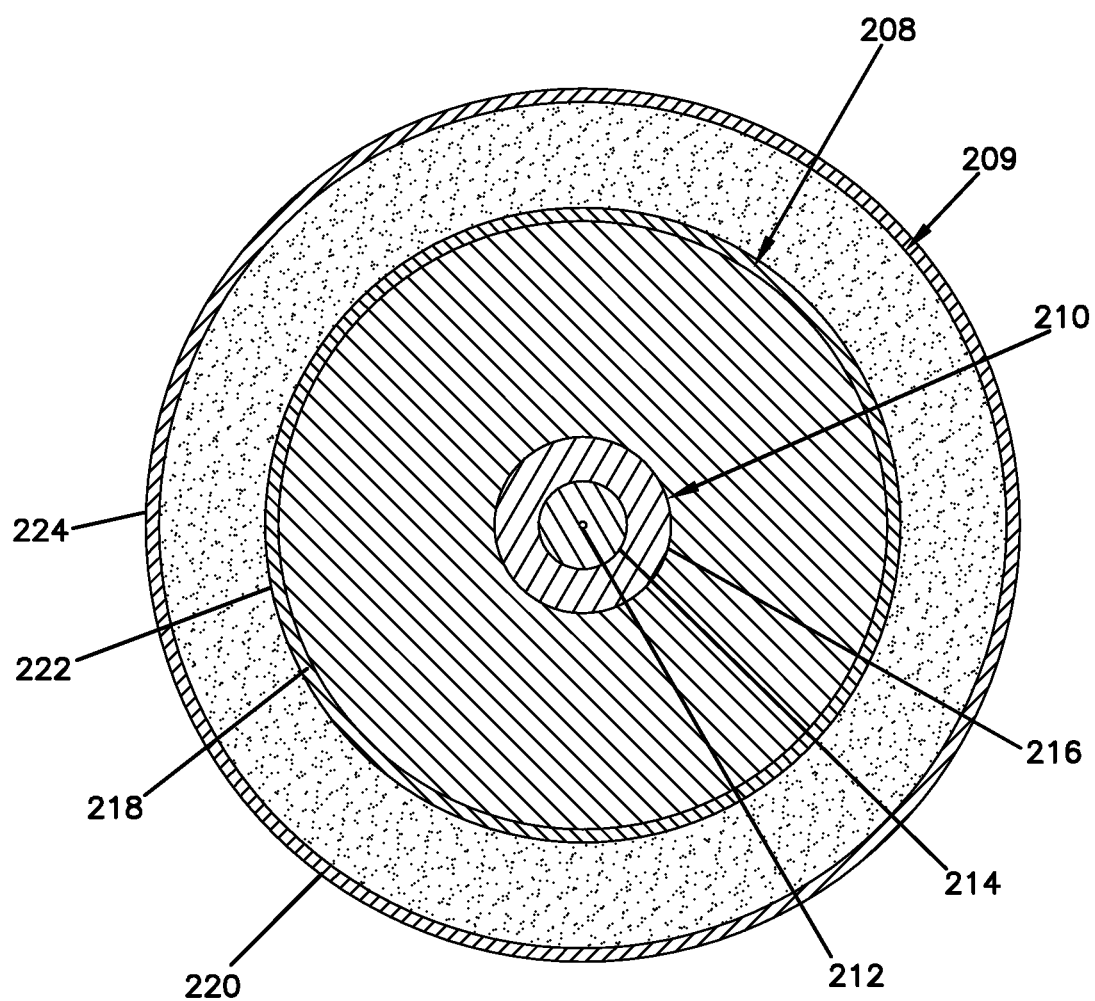
FIG. 10 is a cross-sectional view taken along section line 10-10 of FIG. 9.

In another example, the adhesive arrangement 209 provides coverage of about at least a majority of the circumference of the cable 208. The cable 208 is depicted as a fiber optic cable including a signal carrying element in the form of an optical fiber 210. In one example, the optical fiber 210 can be configured for propagating an optical signal and can include a core 212 surrounded by a cladding layer 214 which is surrounded by a coating layer 216. In one example, core 212 and the cladding layer 214 can have a glass construction. In one example, the core 212 can have a higher index of refraction than the cladding layer 214. In one example, the core 212 has an outer diameter of about 8 to 12 microns, the cladding 214 has an outer diameter in the range of 120 to 130 microns and the coating layer 216 has an outer diameter in the range of about 230 to 270 microns. The cable 208 also includes a buffer layer 218 that surrounds the coating layer 216. In one example, the buffer layer 218 has an outer diameter in the range of 700 to 1100 microns. In another example, buffer layer 218 has an outer diameter in the range of 800 to 1,000 microns. In certain examples, the buffer layer 218 includes a composition formed from at least polyvinyl chloride. Referring still to FIG. 10, the adhesive arrangement 209 includes a thermally activated adhesive layer 220 that adheres to the buffer layer 218 through the assistance of a tie-layer 222. In one example, the adhesive layer 220 includes a composition formed from at least EVA, and the tie-layer 222 includes a composition formed from at least dipiperazine. The cable assembly 200 also includes a low tack layer 224 that surrounds the adhesive layer 220 to prevent the coils of the adhesive coated cable from adhering to one another on the spool 202. In one example, the low tack layer 224 includes a wax.

Figure 11:
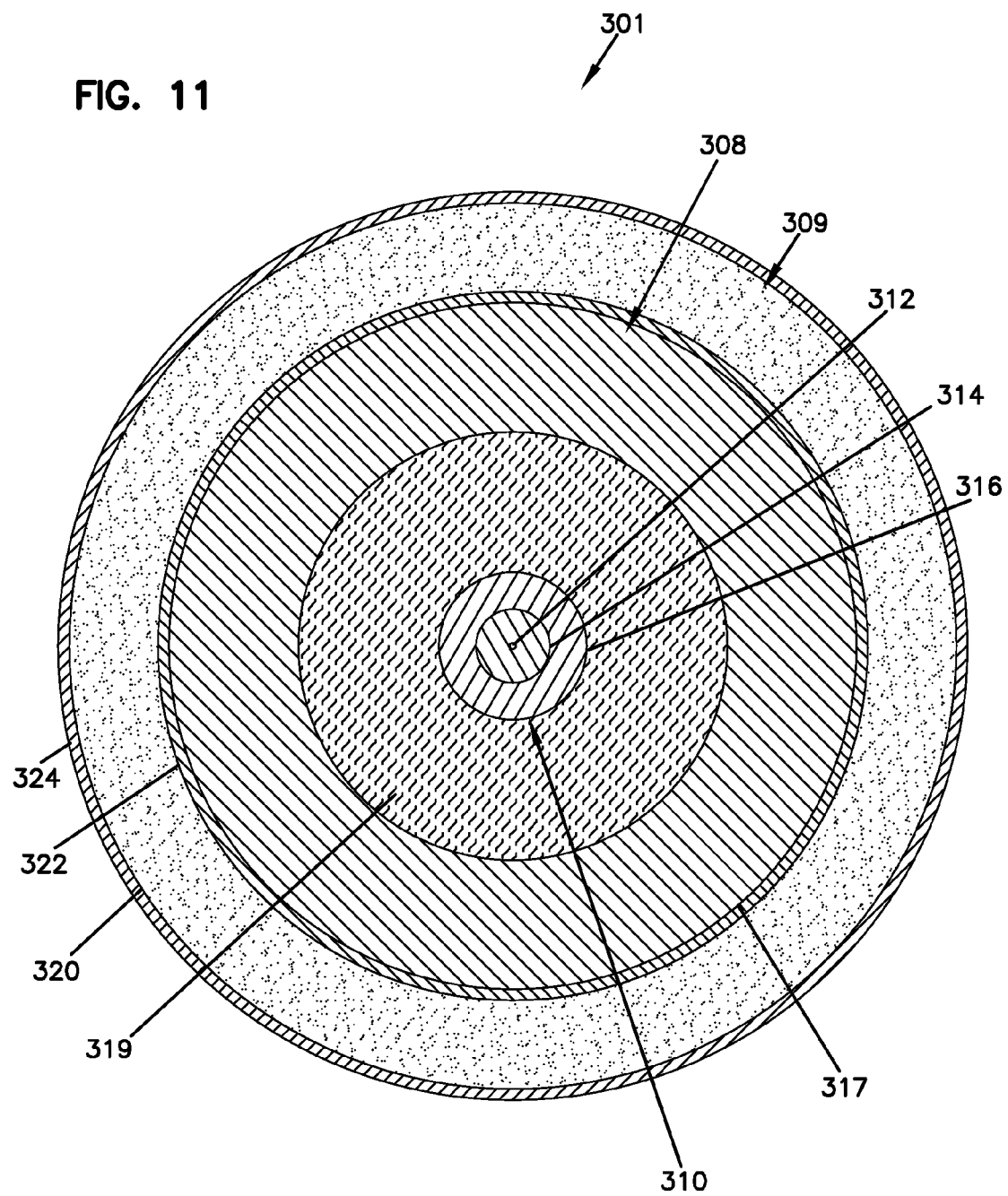
FIG. 11 is a cross-sectional view showing an alternative cable configuration for the cable assembly of FIG. 9.

FIG. 11 is a cross-sectional view of another adhesive coated cable arrangement 301 that can be coiled about a spool such as the spool 202 of FIG. 9. The cable arrangement 301 includes a cable 308 and an adhesive arrangement 309 that covers the cable 308. In one example, the adhesive arrangement 309 provides full adhesive coverage (e.g., 360 degrees of coverage) around the circumference of the cable 308. In another example, the adhesive arrangement 309 provides coverage of about a majority of the circumference of the cable 308. The cable 308 is depicted as a fiber optic cable including a signal carrying element in the form of an optical fiber 310. In one example, the optical fiber 310 can be configured for propagating an optical signal and can include a core 312 surrounded by a cladding layer 314 and a coating layer 316. In one example, core 312 and the cladding layer 314 can have a glass construction. In one example, the core 312 can have a higher index of refraction than the cladding layer 314. The cable 308 can also include an outer jacket 317 and a strength layer 319 positioned between the coating layer 316 and the outer jacket 317. In one example, the strength layer 319 can be configured to provide tensile reinforcement to the cable 308 and can include a plurality of reinforcing members such as fiberglass or Aramid yarns. In one example, the outer jacket 317 can define an outer diameter less than 1500 microns, or less than 1300 microns, or in the range of 100 to 1300 microns. The adhesive arrangement 309 is shown including a thermally activated adhesive layer 320 tied to the outer jacket 317 by a tie-layer 322. The adhesive arrangement 309 also includes a low tack layer 324 that covers the adhesive layer 320. In one example, the low tack layer 324 can include wax.

Figure 12:
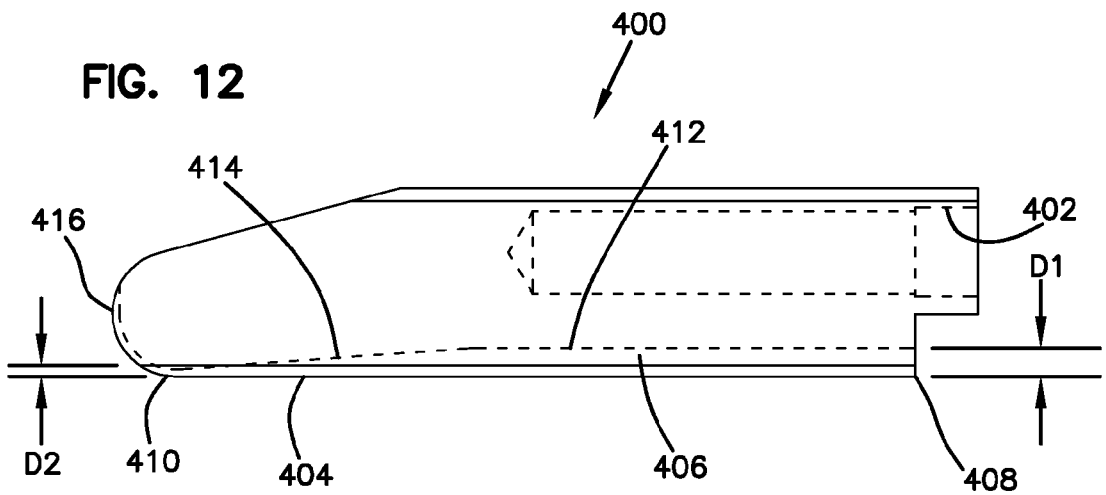
FIG. 12 is a side view of an installation tip in accordance with the principles of the present disclosure.
Figure 13:
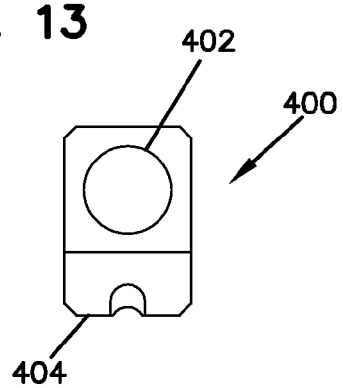
FIG. 13 is a right end view of the installation tip of FIG. 12.
Figure 14:
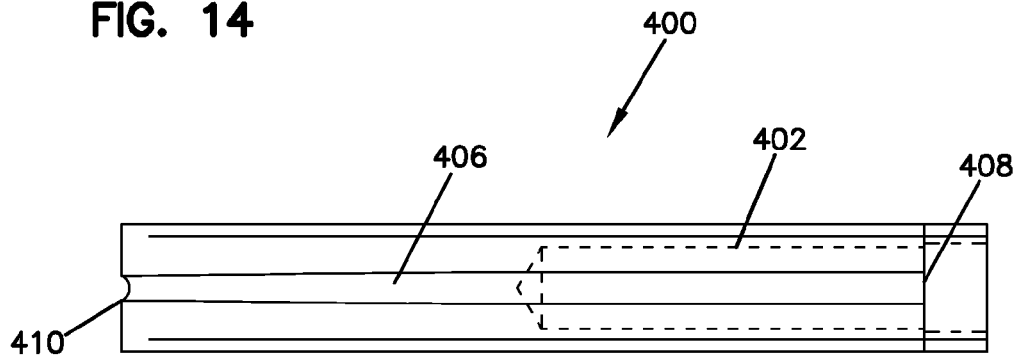
FIG. 14 is a bottom view of the installation tip of FIG. 12.
Figure 15:
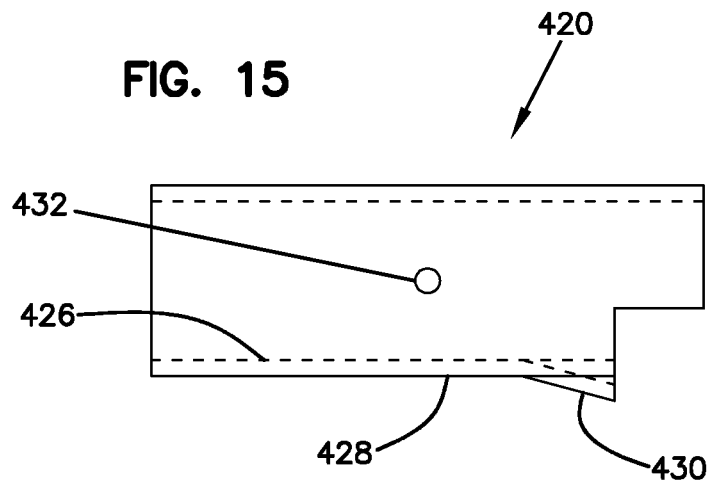
FIG. 15 is a side view of a slide cover with the installation tip of FIG. 12.
Figure 16:
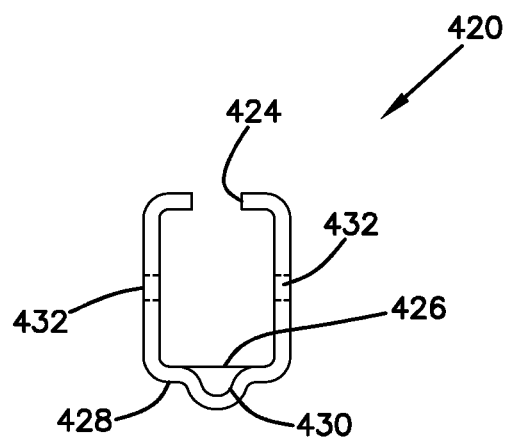
FIG. 16 is a left end view of the slide cover of FIG. 15.
Figure 17:
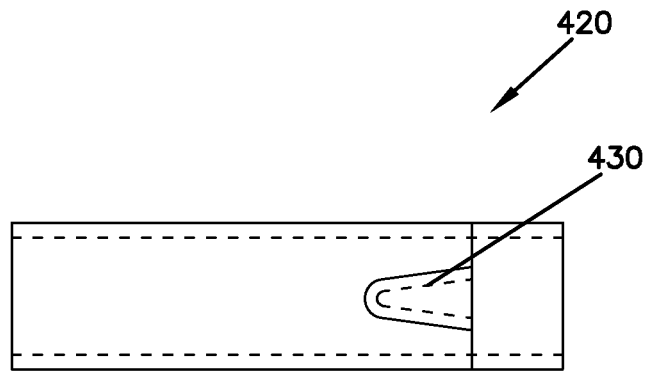
FIG. 17 is a bottom view of the slide cover of FIG. 15.

FIGS. 12-14 illustrate another installation tip in accordance with the principles of the present disclosure. The installation tip 400 defines a receptacle 402 for receiving a heating element (e.g., the tip of a soldering iron). The installation tip 400 includes a bottom side 404 at which a cable channel 406 is defined. The cable channel 406 has an open bottom side and extends along a length of the installation tip 400 from a cable entrance end 408 to a cable exit end 410. The cable channel 406 has a first section 412 having a constant depth D1 and a second section 414 having a depth D2 that varies. Specifically, the depth D2 gradually decreases as the cable channel 406 extends from the first section 412 to the cable exit end 410. In one example, the depth D2 at the cable exit end 410 is less than the diameter of the adhesive coated cable desired to be installed with the depth 400. In certain examples, the depth D2 at the cable exit end 410 is less than 75% of the diameter of the adhesive coated cable. Still referring to FIG. 12, the installation tip 400 defines a rounded end 416 adjacent the cable exit end 410. The decreased depth provided along the second section 414 allows the adhesive coated cable to be pressed against a wall without contacting the installation tip 400 against the wall and while allowing positioning of the adhesive coated cable to be controlled during application. In certain examples, the depth D2 adjacent the cable exit end 410 is between 50% and 75% of the diameter of the adhesive coated cable.

Figure 21:
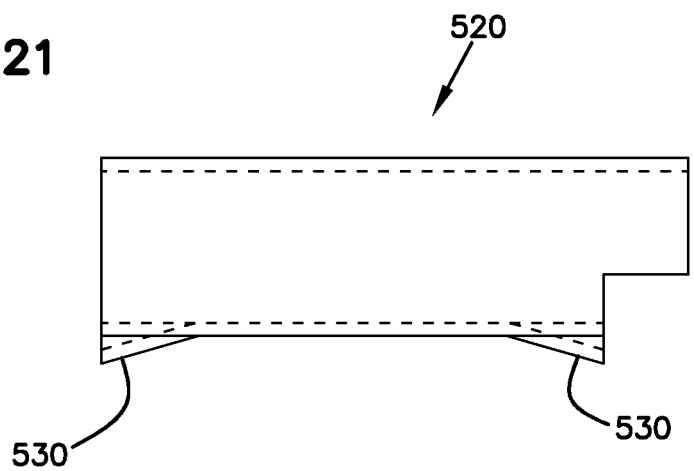
FIG. 21 is a side view of a slide cover adapted for use with the tip of FIG. 18.
Figure 22:
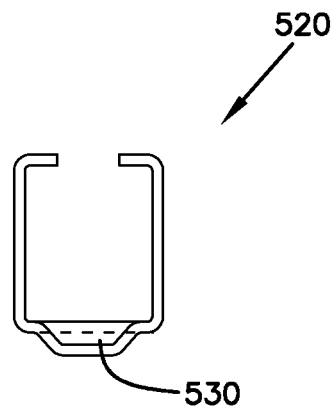
FIG. 22 is a left end view of the slide cover of FIG. 21.
Figure 23:
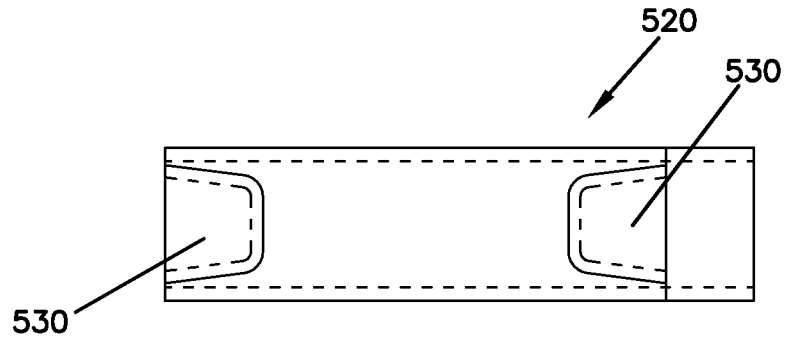
FIG. 23 is a bottom view of the slide cover of FIG. 21.

FIGS. 21-23 show a slide cover 420 that is used in combination with the installation tip 400. Specifically, the slide cover 420 is used to close the open bottom side of the cable channel 406 such that the adhesive coated cable being installed is captured within the cable channel 406 between the installation tip 400 and the slide cover 420. The slide cover 420 and the installation tip 400 cooperate to define the oven of the installation tool. The slide cover 420 includes a top side 422 having a slot 424 that extends through the entire length of the slide cover 420. In this way, an adhesive coated cable can be inserted into the cable channel 406 of the installation tip 400, and then the slide cover 420 can be inserted over the installation tip 400 by initially passing the cable into the interior of the slide cover 420 through the slot 424 and then sliding the slide cover 420 axially onto the installation tip 400 such that the cable is captured between the bottom side 404 of the installation tip 400 and an upper surface 426 of a bottom side 428 of the slide cover 420. The bottom side 428 of the slide cover 420 can include a ramp structure 430 that is positioned adjacent to the cable entrance end 408 of the installation tip 400 when the slide cover 420 is mounted on the installation tip 400. The ramp 430 functions as a tapered lead-end for guiding the adhesive coated cable into the cable channel 406 during the installation process. The slide cover 420 can further include openings 432 in the side walls of the slide cover 420. The openings 432 can be configured for receiving a tool (e.g., a pliers, tweezer or other clamping or grasping type tool) used to remove the slide cover 420 from the installation tip 400. In certain examples, the slide cover 420 can be insulated on its exterior.

It will be appreciated that the open sided channel configuration of the installation tip 400 combined with the open slotted configuration of the slide cover 420 allows adhesive coated optical fibers to be easily inserted into and removed from the installation tip 400. This is particularly useful for applications where it is desired to route a cable through a wall. In such situations, the installer may initially lay out the cable so as to have a first length on one side of the wall, a second length that extends through the wall and a third length on the opposite side of the wall. In this type of situation, the installer can load the adhesive coated cable into the installation tool at the first length and then use the installation tool to adhere the first length to the wall. When the installer reaches the opening through the wall, the installation tool can be removed from the adhesive coated cable and the installer can move to the opposite side of the wall where the installation tool is installed over the third length of the adhesive coated cable. Thereafter, the third length of adhesive coated cable can be adhered to the wall. On completion of the installation process, the installation tool can be removed from the adhesive coated cable.

Figure 18:
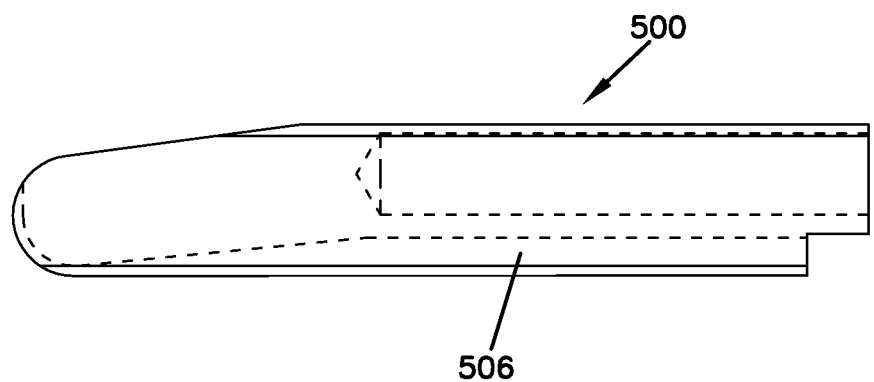
FIG. 18 is a side view of another installation tip in accordance with the principles of the present disclosure.
Figure 19:
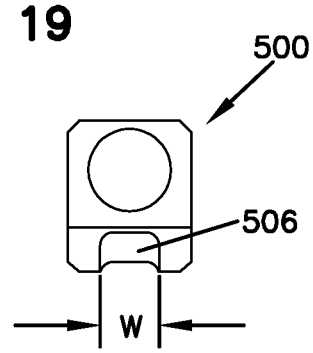
FIG. 19 is a right end view of the installation tip of FIG. 18.
Figure 20:
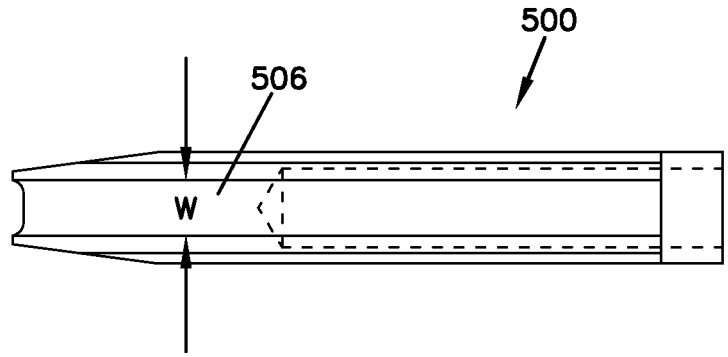
FIG. 20 is a bottom view of the installation tip of FIG. 18.

FIGS. 18-20 show another installation tip 500 in accordance with the principles of the present disclosure. The installation tip 500 has the same basic configuration as the installation tip 400 except the installation tip 500 has been provided with a cable channel 506 that has been widened so as to have a width W sized to accommodate at least two adhesive covered cables at once. In this way, installation tip 500 allows an installer to simultaneously apply more than one cable to a surface such as the surface of a wall. FIGS. 21-23 illustrate a slide cover 520 adapted for use with the installation tip 500. The slide cover 520 has the same basic configuration as the slide cover 420 except ramped lead-in structures 530 have been provided at opposite ends of the slide cover 520 and the ramped lead-in structures 530 are sized to accommodate at least two adhesive coated fiber optic cables.

Figure 24:
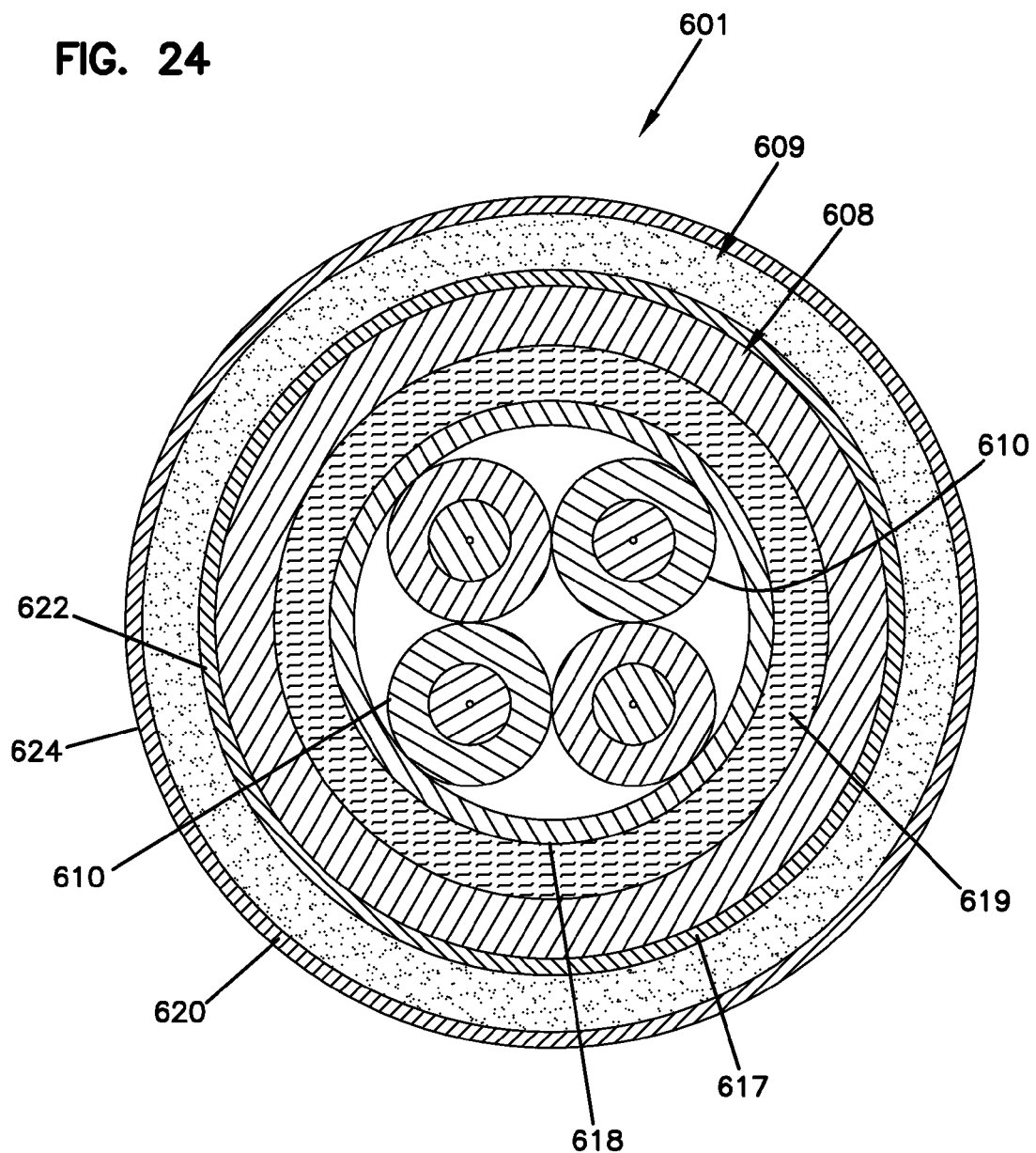
FIG. 24 shows another adhesive coated cable arrangement in accordance with the principles of the present disclosure.

FIG. 24 illustrates another adhesive coated cable arrangement 601 in accordance with the principles of the present disclosure that can be coiled about a spool such as the spool 202 of FIG. 9. The cable arrangement 601 includes a cable 608 and an adhesive arrangement 609 that covers the cable 608. The cable 608 is depicted as a multi-fiber fiber optic cable including a plurality of signal carrying elements in the form of optical fibers 610. The cable 608 also includes a buffer tube 618 that surrounds the optical fibers 610, an outer cable jacket 617 and a strength layer 619 positioned between the buffer tube 618 and the outer cable jacket 617. Similar to previous examples, the adhesive arrangement 609 is shown including a thermally activated adhesive layer 620 tied to the outer jacket 617 by a tie-layer 622. The adhesive arrangement 609 also includes a low tack layer 624 that covers the adhesive layer 620. In one example, the low tack layer 624 can include wax.

Figure 25:
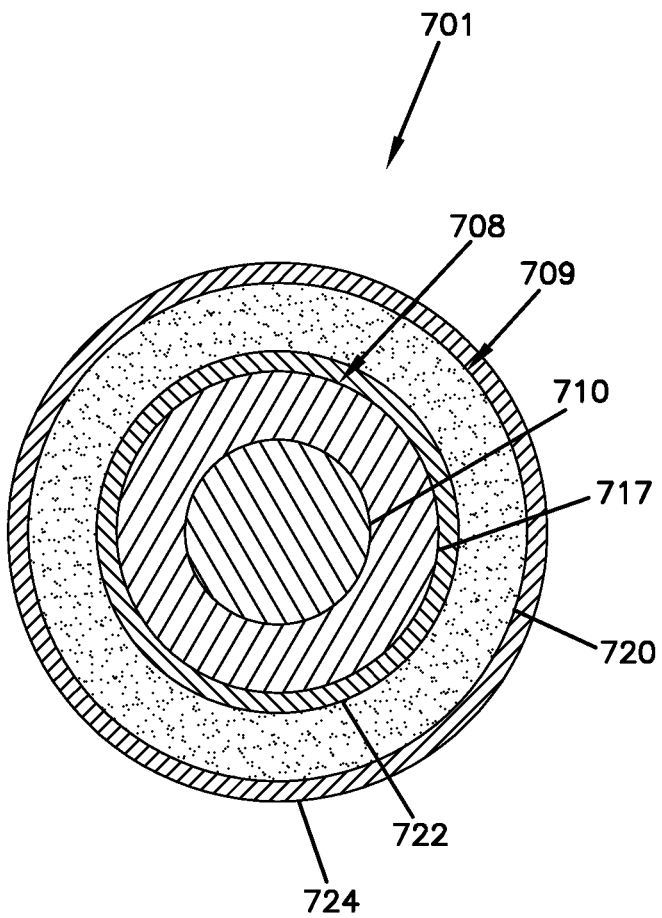
FIG. 25 shows still another adhesive coated cable arrangement in accordance with the principles of the present disclosure.

FIG. 25 is a cross-sectional view showing another adhesive coated cable arrangement 701 in accordance with the principles of the present disclosure that can be coiled about a spool such as the spool 202 of FIG. 9. The cable arrangement 701 includes a cable 708 and an adhesive arrangement 709 that covers the cable 708. The cable 708 is depicted as an electrical cable including a signal carrying element in the form of an electrical conductor 710 (e.g., copper core). It will be appreciated that the electrical conductor 710 is configured for propagating an electrical signal through the cable. The cable 708 can also include an outer jacket 717 that surrounds the electrical conductor 710. Similar to previously described examples, the adhesive arrangement 709 can include a thermally activated adhesive layer 720 tied to the outer jacket 717 by a tie layer 722. The adhesive arrangement 709 also includes a low tack layer 724 that covers the adhesive layer 720. In one example, the low tack layer 724 can include wax.

Figure 26:
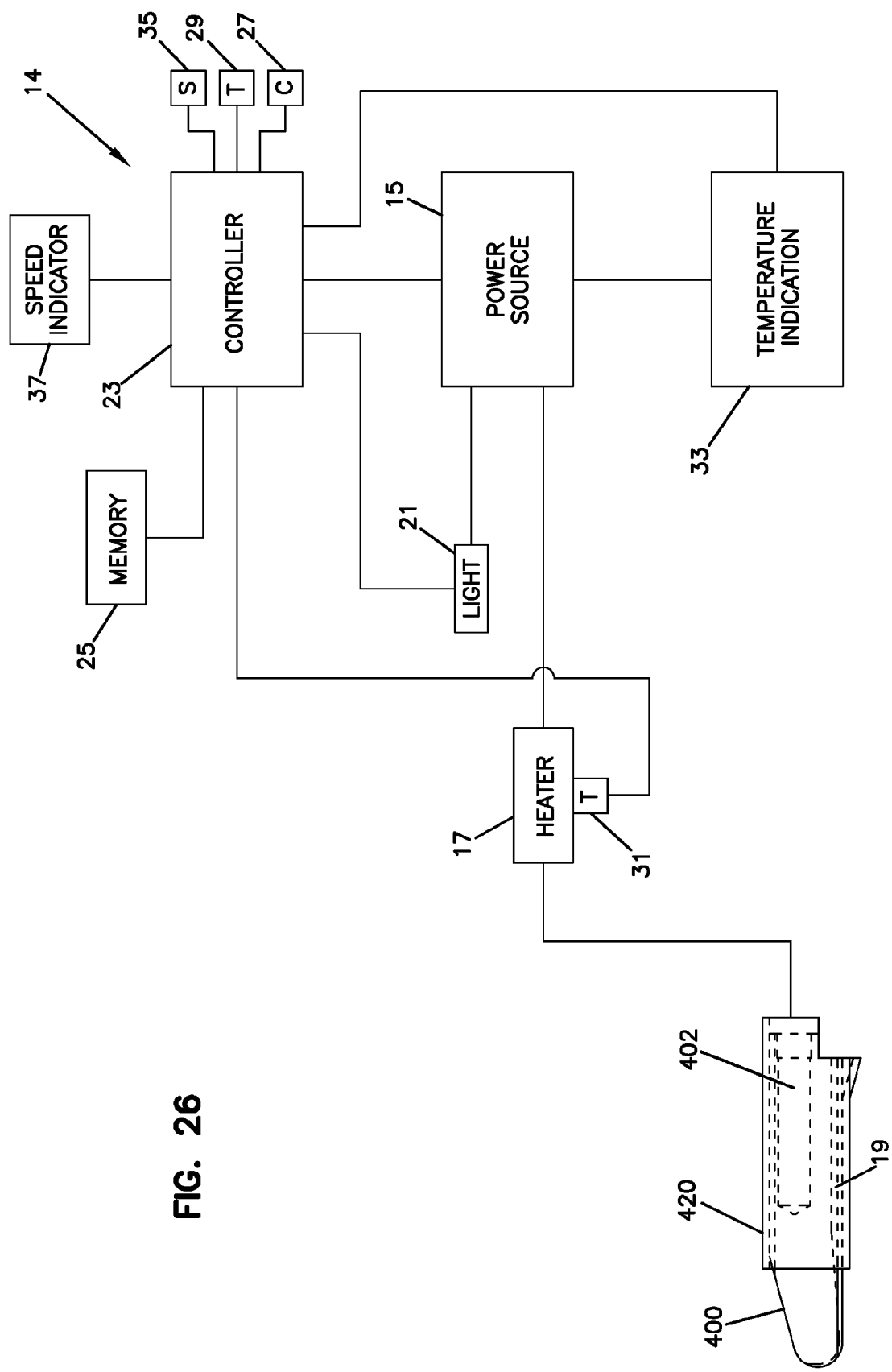
FIG. 26 is a schematic of a control system of an installation tool in accordance with the principles of the present disclosure.

FIG. 26 is a schematic representation of the installation tool 14 in combination with the installation tip 400 and the slide cover 420 (shown mounted over the installation 400). As shown at FIG. 26, the installation tool 14 includes a power source 15 (e.g., a battery, a battery pack, an electrical cord, a butane power source, or other type of power source) that is used to provide power to a heating element 17 (e.g., the soldering iron tip 16). In use, it will be appreciated that the heater 17 fits within the receptacle 402 of the installation tip 400 and is adapted to heat the installation tip 400 such that an oven 19 defined between the installation tip 400 and the slide cover 420 is heated to a desired temperature suitable for melting/softening the adhesive of an adhesive coated cable being installed by the tool 14. As depicted at FIG. 26, the tool 14 also includes a light 21 (e.g., a light emitting diode) that can be powered to allow the installer to illuminate the surface to which the cable is being adhered during the installation process. The tool 14 also includes an electronic controller 23 that interfaces with memory 25 and also interfaces with the power source 15 and various other components of the tool 14. For example, the controller 23 can receive data from a sensor 35 used to determine the speed at which cable is being adhered to a surface. In one example, the sensor 35 can include a rotary encoder or other type of roller structure that rolls along the surface as cable is being installed. The controller 23 can also interface with a speed indicator display 37 that indicates the speed of application to the installer. For example, the display 37 (e.g., a gauge, light, flashing light, etc.) can indicate a numerical speed or can include a simple indicator (e.g., a light that turns on or off or red or green or flashes at a given rate) that provides an indication to the installer that a suitable installation speed is being detected or an unsuitable installation speed is being detected. The controller 23 also interfaces with a clock/timer 27 for timing the duration of events (e.g., the elapsed heating time of the heater 17) and a temperature sensor 29 for providing data relating to the ambient temperature. Additionally, the controller 23 interfaces with a temperature sensor 31 that provides temperature data relating to the temperature of the heater 17. Empirical data can be stored in memory 25 relating to a relationship between the temperature of the heater 17 and the temperature within the oven 19. In determining the temperature of the oven 19, various factors such as the ambient temperature 29 and the duration that the heater 17 has been activated (e.g., as determined by the timer 17) can be taken into consideration. Additionally, the controller 23 can interface with a temperature indicator 33 that provides an indication of the temperature of the heater 17 and/or the temperature of the oven 19. In one example, the temperature indicator 33 can include a light that illuminates once the heater 17 and/or the oven 19 reaches a temperature suitable for initiating the cable installation process. In other examples, temperature indicator 33 can provide a numerical or other quantitative representation of the temperature of the heater 17 and/or the oven 19. In certain examples, the controller 23 can be configured to vary the temperature of the heater 17 and/or the oven 19 based on the speed at which cable is adhered to a surface as indicated by the sensor 25. For example, the controller can vary the temperature in direct proportion to the speed at which the cable is applied. For example, the temperature of the heater 17 can be increased with increased application speeds and can be decreased with decreased application speeds.

Modifications and substitutions by one of ordinary skill in the art are considered to be within the scope of the present invention, which is not to be limited except by the allowed claims and their legal equivalents.

What is claimed is:

1. A method of installing a cable pre-coated with hot-melt adhesive to a surface, comprising:
    applying heat to a heating and installation tip using a heating element, the heating and installation tip defining a receptacle for receiving the heating element and defining a channel extending along a length of the heating and installation tip, the channel leading to a rounded tip of the heating and installation tip;
    heating said cable pre-coated with hot melt adhesive with the heating and installation tip sufficient to cause said hot-melt adhesive to become softened and adhere to a surface; and
    pressing the rounded tip of the heating and installation tip against said cable to apply sufficient pressure to said adhesive softened cable pre-coated with a hot-melt adhesive to adhere said cable to said surface;
    wherein said heating and installation tip includes a slide cover having at least one longitudinal opening extending a complete length of said slide cover wherein said heating and installation tip in combination with said slide cover when in use generally surrounds said cable pre-coated with hot-melt adhesive and supplies sufficient heat generally completely around said cable thereby causing a sufficient quantity of said hot melt adhesive to become softened for allowing said cable to be adhered to a surface.

2. The method of claim 1, wherein said cable has a diameter of between .9 and 1.9 mm.

3. The method of claim 2, wherein said hot-melt adhesive is applied to said cable in a thickness of between 300 and 400 μ.

4. The method of claim 1, wherein said cable pre-coated with a hot-melt adhesive includes a wax coating over said hot-melt adhesive coating.

5. The method of claim 1, wherein said cable is a single fiber, fiber optic cable.

6. The method of claim 1, wherein said cable is a multiple fiber, fiber optic cable.

7. The method of claim 1, wherein said heating element is a battery operated heating tool.

8. The method of claim 7, wherein said battery-operated heating tool is a battery operated soldering iron.

9. The of claim 1, wherein said heating element includes a heating tip, and wherein said heating and installation tip is configured to slide over and engage with said heating tip of said heating element.

10. The method of claim 1, wherein said channel includes a first and a second end, and wherein said first and second ends of said channel include a conically shaped opening into which said hot-melt adhesive coated cable enters and exits respectively.

11. A heating device for installing a hot-melt adhesive coated cable to a surface, comprising:
    a heating device, configured for heating said cable pre-coated with hot melt adhesive with sufficient heat to cause said hot-melt adhesive to become softened and adhere to a surface, wherein said heating device comprises a heating tool including a heating and installation tip, wherein said heating and installation tip includes a slide cover having at least one longitudinal opening extending a complete length of said slide cover, and wherein said heating and installation tip in combination with said slide cover when in use generally surrounds said cable pre-coated with hot-melt adhesive and supplies sufficient heat generally completely around said cable thereby causing a sufficient quantity of said hot melt adhesive to become softened for allowing said cable to be adhered to a surface.

12. The heating device of claim 11, wherein said heating device is a battery operated heating tool.

13. The heating device of claim 12, wherein said battery-operated heating tool is a battery operated soldering iron.

14. The heating device of claim 11, wherein said heating tool includes a heating tip, and wherein said heating and installation tip is configured to slide over and engage with said heating tip of said heating tool.

15. The heating device of claim 14, wherein said heating and installation tip includes a first portion having a first opening, said first opening configured for engaging with said heating tip of said heating tool, and wherein said heating and installation tip includes a second portion having a rounded tip, configured for applying pressure to said cable having said adhesive softened hot-melt adhesive against a surface to which said cable is to be adhered.

16. The heating device of claim 15, wherein said first portion of said heating and installation tip includes a channel on one side of said heating and installation tip and wherein said channel includes a first and a second end, and wherein said first and second ends of said channel include a conically shaped region into which said hot-melt adhesive coated cable enters and exits respectively.

17. The method of claim 1, wherein the cable is round and wherein the hot-melt adhesive has a thickness that is in the range of 10-50 percent of an outer diameter of the cable.

18. The method of claim 1, wherein the hot-melt adhesive has an open time of at least 2 seconds at 65 degrees F.

19. The method of claim 18, wherein the hot-melt adhesive has an open time in the range of 2-5 seconds at 65 degrees F.

20. The method of claim 4, wherein the wax coating has a thickness that is less than 10 percent of the thickness of the hot-melt adhesive.

21. The method of claim 4, wherein the wax coating includes a non-ionic paraffin wax having a melting temperature less than 150 degrees F.

22. The method of claim 1, wherein the hot-melt adhesive has a thickness of 250 to 350 microns.

23. A method of installing a cable pre-coated with hot-melt adhesive to a surface, comprising:
applying heat to a heating and installation tip using a heating element, the heating and installation tip defining a receptacle for receiving the heating element and defining a channel extending along a length of the heating and installation tip, the channel leading to a rounded tip of the heating and installation tip;
heating said cable pre-coated with hot melt adhesive with the heating and installation tip sufficient to cause said hot-melt adhesive to become softened and adhere to a surface; and
pressing the rounded tip of the heating and installation tip against said cable to apply sufficient pressure to said adhesive softened cable pre-coated with a hot-melt adhesive to adhere said cable to said surface;
wherein said heating and installation element is a battery operated soldering iron.

24. The method of claim 23, wherein said cable has a diameter of between .9 and 1.9 mm.

25. The method of claim 24, wherein said hot-melt adhesive is applied to said cable in a thickness of between 300 and 400 μ.

26. The method of claim 23, wherein said cable pre-coated with a hot-melt adhesive includes a wax coating over said hot-melt adhesive coating.

27. The method of claim 26, wherein the wax coating has a thickness that is less than 10 percent of the thickness of the hot-melt adhesive.

28. The method of claim 26, wherein the wax coating includes a non-ionic paraffin wax having a melting temperature less than 150 degrees F.

29. The method of claim 23, wherein said cable is a single fiber, fiber optic cable.

30. The method of claim 23, wherein said cable is a multiple fiber, fiber optic cable.

31. The method of claim 23, wherein the cable is round and wherein the hot-melt adhesive has a thickness that is in the range of 10-50 percent of an outer diameter of the cable.

32. The method of claim 23, wherein the hot-melt adhesive has an open time of at least 2 seconds at 65 degrees F.

33. The method of claim 32, wherein the hot-melt adhesive has an open time in the range of 2-5 seconds at 65 degrees F.

34. The method of claim 23, wherein the hot-melt adhesive has a thickness of 250 to 350 microns.

\* \* \* \* \*

UNITED STATES PATENT AND TRADEMARK OFFICE
CERTIFICATE OF CORRECTION

PATENT NO. : 9,263,870 B2
APPLICATION NO. : 14/063732
DATED : February 16, 2016
INVENTOR(S) : Mann Page 1 of 1

It is certified that error appears in the above-identified patent and that said Letters Patent is hereby corrected as shown below:

In the Claims

Column 18, Line 1, Claim 23: "heating and installation element" should read --heating element--

Signed and Sealed this
Sixth Day of August, 2019

Andrei Iancu
*Director of the United States Patent and Trademark Office*